M. OMALIA.
NUT LOCK.
APPLICATION FILED DEC. 16, 1909.
970,101.
Patented Sept. 13, 1910.
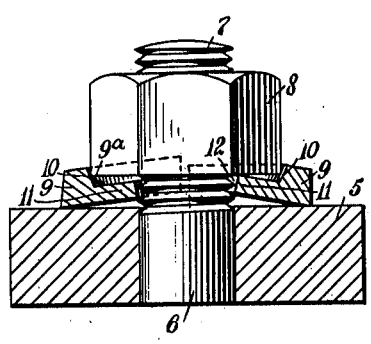
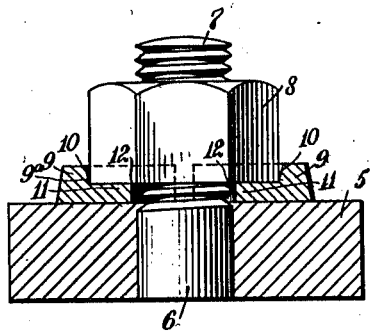
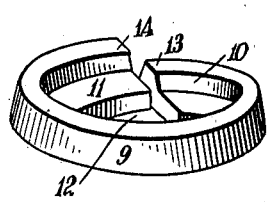
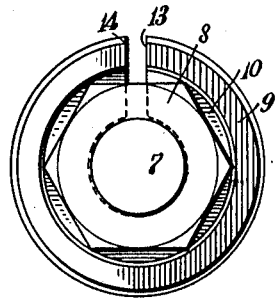
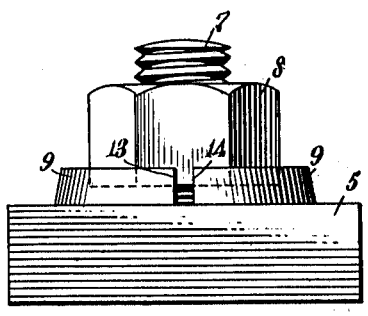
WITNESSES:
INVENTOR
Michael Omalia
BY
ATTORNEYS

UNITED STATES PATENT OFFICE.

MICHAEL OMALIA, OF SCRANTON, PENNSYLVANIA, ASSIGNOR OF ONE-SIXTH TO WILLIAM S. ROBINSON AND ONE-SIXTH TO WILLIAM W. BAYLOR, OF SCRANTON, PENNSYLVANIA.

NUT-LOCK.

970,101. Specification of Letters Patent. Patented Sept. 13, 1910.

Application filed December 16, 1909. Serial No. 533,326.

*To all whom it may concern:*

Be it known that I, MICHAEL OMALIA, a citizen of the United States, and a resident of Scranton, in the county of Lackawanna and State of Pennsylvania, have invented a new and Improved Nut-Lock, of which the following is a full, clear, and exact description.

My invention relates to nut locks, more particularly of the kind requiring simple substantial construction and used, for instance, in railroad work.

Generally speaking, my invention comprises a single member of spring metal, so formed that when subjected to pressure by a nut, the spring member is distorted in three distinct ways, and thereby develops three distinct kinds of torque for the purpose of holding the nut.

Reference is to be had to the accompanying drawings forming a part of this specification, in which similar characters of reference indicate corresponding parts in all the figures.

Figure 1 is a section through the improved nut lock showing its appearance before the nut is forced down upon it; Fig. 2 is a section similar to Fig. 1, but showing the appearance of the parts when the nut is screwed down hard; Fig. 3 is a perspective showing the spring member constituting the nut lock; Fig. 4 is a plan view of the structure shown in Fig. 2; and Fig. 5 is an elevation of said structure.

At 5 is a sill or beam, and extending from it is a bolt 6 provided with a threaded portion 7, and fitting upon the latter is a revoluble nut 8, these parts being of the usual or any desired construction.

The nut lock is shown at 9 and consists generally of a member of spring metal bent in spiral form, as indicated in Fig. 3, so as to form a little less than one complete turn or convolution of a spiral. This member of spring metal is provided internally with a face 10 which is slightly curved in the direction of a plane passing diametrically through it, as will be understood from Fig. 2. The member 9 is further provided with a rabbet 11 integral with its lower edge and extending inwardly so as to leave an annular space 12, sufficient to clear the threaded portion 7 of the bolt at all times. The inner wall 10, or curved surface, joins the upper surface of the rabbet 11 at 9ª, thus forming a corner angle, as will be understood from Figs. 1 and 2. The ends of the member 9 are shown at 13, 14 (Fig. 3) and normally occupy different planes but are adapted to be forced into the same plane when sufficient pressure is applied to the spring member 9. That is to say, the ends 13, 14 are staggered, but when sufficient pressure is applied to the member 9 the ends 13, 14 may be brought into registry with each other. The inner surface 10 of the spring member 9 is so formed that when it is engaged by the nut 8 and the latter is forced down, as indicated in Fig. 2, the descent of the nut forces the surface 10 outwardly so that the general diameter of the nut lock is increased slightly. The descent of the nut also causes it to bind flatly against the rabbet 11 and in doing this the rabbet in question is forced down flat, as indicated in Fig. 2. Normally, that is before the nut 8 exerts any pressure, the rabbet 11 is inclined slightly in relation to any surface upon which it rests, as, for instance, the upper surface of the beam or sill 5, as indicated in Fig. 1.

The operation of my device is as follows: The nut lock 9 is slipped over the threaded portion 7 of the bolt, and the nut 8 is fitted upon this threaded portion and is screwed down. When the nut 8 in its descent reaches the general position indicated in Fig. 1, the lower portion of the nut begins to press outwardly against the curved surface 10. The result is that the general diameter of the nut lock is increased. The nut continuing to descend, it soon engages the inner edges of the rabbet 11. This causes the rabbet 11 to flatten out, so that its cross section appears as in Fig. 2, rather than in Fig. 1. As soon as the rabbet 11 is perfectly flat and one end of it is in registry with its other end, the nut rests flatly upon it and also rests in the corner 9ª, as indicated in Fig. 2.

As will be seen from the foregoing description, the nut in descending forces the nut lock 9 under three distinct kinds of tension. First, it forces the ends 13, 14 into the same plane, thereby causing the nut lock to press upwardly against the nut, somewhat upon the principle of a short spiral spring. Second, the rabbet 11 presses directly upward against the under side of the nut, this pressure being due to the fact that the inner edge of the rabbet is normally higher than its outer edge, as indicated in Fig. 1. The reason, therefore, why the rabbet 11 presses upwardly is that when the nut is down, there is torque due to the fact that in forcing the rabbet 11 down flat, the slight twisting of the nut lock is brought about by the pressure of the nut. Third, owing to the inclination of the curved surface 10 the descent of the nut tends to enlarge the nut lock—that is, to increase its general diameter across.

Having thus described my invention, I claim as new and desire to secure by Letters Patent:

1. A nut lock, comprising a single member of spring metal bent spirally around an imaginary axis and provided with ends normally staggered relatively to each other, so as to occupy different planes, but adapted to be sprung into the same plane, said member being further provided with an inwardly extending rabbet which is normally inclined relatively to said imaginary axis, but is adapted to be sprung into a plane crossing said axis at a right angle.

2. A nut lock, comprising a single member of spring metal bent spirally around an imaginary axis, and provided with a rabbet extending inwardly, said rabbet being normally inclined relatively to the said imaginary axis, but adapted to be pressed flat into a plane crossing said axis at a right angle.

3. A nut lock, comprising a single member of spring metal provided internally with an inclined wall for the purpose of enabling pressure of a nut to spread said member, and thereby increase its general diameter, said member being further provided with a portion extending beneath said nut and adapted to undergo distortion, so as to press upwardly against said under side of said nut.

In testimony whereof I have signed my name to this specification in the presence of two subscribing witnesses.

MICHAEL OMALIA.

Witnesses:
MICHAEL GOLDEN,
MARGARET MARTIN.